United States Patent [19]

Schlueter

[11] Patent Number: 4,490,048
[45] Date of Patent: Dec. 25, 1984

[54] APPARATUS FOR PRODUCING A PREFERABLY CHEMICALLY REACTIVE MIXTURE FROM TWO OR MORE PLASTICS COMPONENTS

[75] Inventor: Klaus Schlueter, Munich, Fed. Rep. of Germany

[73] Assignee: Elastogran Maschinenbau GmbH, Strasslach, Fed. Rep. of Germany

[21] Appl. No.: 457,185

[22] Filed: Jan. 11, 1983

[30] Foreign Application Priority Data

Jan. 22, 1982 [DE] Fed. Rep. of Germany ....... 3201903

[51] Int. Cl.$^3$ .............................................. B01F 15/02
[52] U.S. Cl. .................................... 366/134; 366/167; 366/173; 366/193
[58] Field of Search ............... 222/137, 145, 148, 155; 366/132, 134, 142, 152, 162, 167, 173, 174, 182, 184, 192, 193, 337, 340; 422/108, 111, 112, 133; 425/130, 257

[56] References Cited

U.S. PATENT DOCUMENTS

| | | | |
|---|---|---|---|
| 3,933,312 | 1/1976 | Fries | 425/130 |
| 4,141,470 | 2/1979 | Schulte et al. | 222/137 |
| 4,399,104 | 8/1983 | Coblenz et al. | 366/173 |

FOREIGN PATENT DOCUMENTS

| | | | |
|---|---|---|---|
| 2023862 | 5/1970 | Fed. Rep. of Germany | 366/173 |
| 2612812 | 3/1976 | Fed. Rep. of Germany | |

Primary Examiner—Robert W. Jenkins
Assistant Examiner—Arthur D. Dahlberg
Attorney, Agent, or Firm—Keil & Weinkauf

[57] ABSTRACT

An apparatus comprising a housing with a guide bore in which an expulsion plunger can move to and fro, a portion of the guide bore constituting a mixing chamber which is bounded by the end face of the free end of the plunger and by two nozzle bodies which can be slidingly introduced into the guide bore. The plastics components flow, via inlet channels, through the nozzle bodies into the mixing chamber, the corresponding inlet orifices in the nozzle bodies being exposed during the stroke of these bodies. The end faces of the nozzle bodies constitute a restrictor in the form of an adjustable gap, which gap represents the outlet orifice of the mixing chamber and causes additional mixing of the plastics components. Using the apparatus, constant and good intensity of mixing is attainable, over the entire injection cycle, when processing two reactive plastics components.

8 Claims, 6 Drawing Figures

A-A

A-A

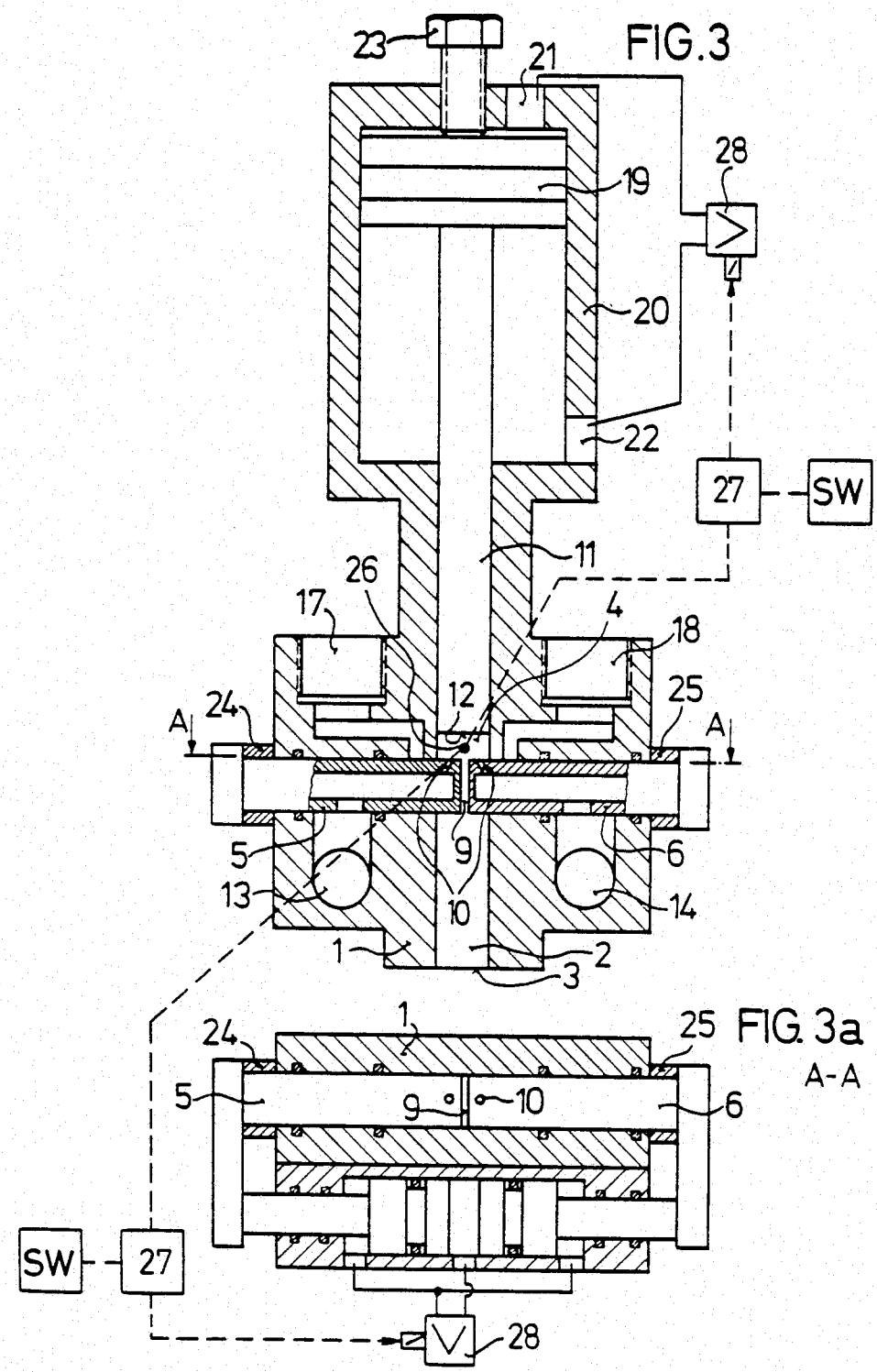

APPARATUS FOR PRODUCING A PREFERABLY CHEMICALLY REACTIVE MIXTURE FROM TWO OR MORE PLASTICS COMPONENTS

The present invention relates to an apparatus for producing a preferably chemically reactive mixture from two or more plastics components, which apparatus comprises a housing having inlet channels for the individual plastics components and a guide bore for an expulsion plunger which can move to and fro, a portion of this guide bore being constructed as a mixing chamber which, in the retracted position of the expulsion plunger, is bounded by the end face of the plunger, while at the opposite side is provided an outlet orifice for the mixture of plastics components, a restrictor, movably located in a bore running transversely to the guide bore of the expulsion plunger, being located immediately downstream of the mixing chamber.

Mixing apparatuses of the above type as a rule operate on the counter-current injection principle, ie. the injection orifices, constructed as nozzles or perforated diaphragms, are located facing one another.

In order to achieve good mixing, a certain pressure has to be maintained within the mixing chamber. Because of the low volume of the mixing chamber, this pressure is difficult to measure. Hence, the theoretical velocity of the reaction mixture leaving the mixing chamber is taken as a measure of the pressure. For example, it has been found that in the production of polyurethane integral foams satisfactory mixing intensity is achieved at an exit velocity of from 20 to 40 meters/second. In the conventional mixing apparatuses the mixing chamber pressure is generated by baffles or perforated diaphragms in the outlet portion downstream of the mixing chamber.

Since these mixing apparatuses are as a rule used to fill molds with the reaction mixture, it is necessary to ensure that the mixture leaves the mixing chamber non-turbulently, so that it enters the mold cavity with laminar flow. This is necessary so that a continuous flow front should be produced and that no air bubbles, which might cause defects in the finished molding, should be whipped into the mixture. This laminar flow is achieved by deflecting cones or calming cones in the outlet portion.

However, these mixing apparatuses provided with internal fitments in the outlet portion require flushing by means of solvent or compressed air. The residual reaction mixture thereby lost pollutes the environment.

It has been disclosed that a restrictor may be introduced into the mixing chamber through the outlet orifice of the latter, so as to improve mixing and, as a result of substantial displacement of the air present in the mixing chamber, to prevent air being whipped into the mixture. However, because of the low outlet flow cross-section, the exit velocity is high, so that the continuous flow front desired for entry of the material into the mold is not guaranteed.

Novel force-controlled mixing apparatuses have the advantage that they operate without a flushing agent; instead, the reaction mixture remaining in the mixing chamber is expelled, by means of an expulsion plunger, towards the end of the mold filling process. However, it is not possible to match the mixing chamber pressure to requirements, nor is it possible to ensure laminar flow from the mixing chamber into the mold cavity.

Since the mixing intensity is inadequate, post-mixers have been provided between the mixing chamber and the mold cavity. These improve mixing and calm the turbulent stream of mixture issuing from the mixing chamber. Such post-mixers are, like the runner, located in the mold parting plane. After curing has taken place, the mixture remaining in the runner and post-mixer must be removed from the molding and constitutes scrap. The sprue mark left on the molding is objectionable and requires a finishing operation.

It is moreover known that in mixing devices having an expulsion plunger, a restrictor which can be advanced transversely into the mixing chamber may be provided between the zone of the inlet orifices and the outlet orifice, in order to influence the degree of mixing by varying the back-pressure. This restrictor is, however, unsuitable for imposing, onto the stream of mixture issuing from the mixing chamber, a sufficiently laminar, calm flow to give a continuous flow front when the mixture enters the mold.

Finally, German Published Application DAS 2,612,812 discloses a mixing head intended to ensure good intensity of mixing through adjustability of the mixing chamber pressure. In this head, a restrictor is provided in the zone between the mixing chamber and the outlet orifice; it is slidable transversely to the mixing chamber and has a passage through which an expulsion plunger can be moved into its expulsion position. This forms a type of additional mixing chamber, which however allows only limited improvement, if any, in the consistency of mixing, through influencing the initial and final flow segments of the plastics components.

It is an object of the present invention to provide an apparatus for producing a preferably chemically reactive mixture of two or more plastics components, which apparatus does not require a flushing agent, permits the stream of mixture to issue in a calmed condition and ensures production operation without substantial loss of material. It is a further object of the invention that the intensity of mixing shall remain both good and constant over the entire injection cycle, this being achievable by adjustability of the mixing chamber pressure and mixing chamber volume.

I have found that this object is achieved by an apparatus for producing a preferably chemically reactive mixture of two or more plastics components, which apparatus comprises a housing having inlet channels for the individual plastics components and a guide bore for an expulsion plunger which can move to and fro, a portion of this guide bore being constructed as a mixing chamber which, in the retracted position of the expulsion plunger, is bounded by the end face of the plunger, while at the opposite side is provided an outlet orifice for the mixture of plastics components, a restrictor, movably located in a bore running transversely to the guide bore of the expulsion plunger, being located immediately downstream of the mixing chamber, the restrictor being formed of two at least approximately coaxially arranged nozzle bodies which can slidingly enter the guide bore, in doing so free inlet orifices for the plastics components, and define an adjustable gap between them.

According to the invention, the start of the injection cycle is when the nozzle bodies are slidingly introduced into the guide bore or mixing chamber, so as to bring the bodies to a defined distance from one another. At the same time, the component streams are released into the mixing chamber. The mixing chamber pressure is essentially adjusted by adjusting the stroke of the nozzle bodies, these being themselves so adjustable that the gap between the two bodies, ie. the cross-section of flow from the mixing chamber, can be varied. Moreover, the mixing chamber volume can also be varied by varying the position of the expulsion plunger, which can be brought into the desired position with the aid of, for example, a stroke restrictor. This additional variable in the mixing chamber geometry has the effect that by adapting the mixing chamber volume the premature flow and delayed flow of the plastics components, which lead to flaws in the molding, are avoided, ie. the fact that the flow conditions in the mixing chamber can be influenced directly results in substantially improved mixing.

The fact that the apparatus can operate without flushing agent and without loss of material results from the expulsion plunger having the same cross-section as the guide bore; towards the end of the mold filling process the plunger empties the mixing chamber and, after appropriate positioning of the nozzle bodies, can be moved right up to the outlet orifice of the guide bore. The appropriate synchronization of the nozzle bodies and expulsion plunger is achieved by means of a control device which operates electrically, hydraulically, mechanically and/or pneumatically.

A further feature of the invention is that the inlet orifices are so arranged relative to the mixing chamber that the plastics components impinge on one another at an angle. This point of impingement of the component jets can be varied according to the arrangement of the inlet orifices in the nozzle bodies and according to the position of the nozzle bodies. In this way it is in particular possible to influence the spread and volume of the jets so as to ensure optimum mixing of the plastics components. The nozzle bodies are arranged to be slidable preferably at right angles to the lengthwise axis of the guide bore. However, it is also conceivable to have the nozzle bodies at an angle to one another instead of diametrically opposite one another.

In a further development of this measure, the nozzle bodies can be adjusted independently of one another as regards their distance from the lengthwise axis of the guide bore. In this way it is possible to produce an additional vortex movement in the mixing chamber, especially if the latter has a circular cross-section, and this movement correspondingly influences the mixing achieved.

In a particularly advantageous embodiment of the invention, the stroke of the nozzle bodies can be controlled as a function of the mixing chamber pressure. For this purpose, the pressure in the mixing chamber is recorded by means of a measuring device, for example a sensor, and is digitalized as pulses, and the actual values found are compared with digitalized intended values, deviations between the intended and actual values being used for feedback control. This arrangement can be used via suitable devices, such as regulating valves, to vary both the position of the nozzle bodies, ie. the size of gap between the nozzle bodies, and the position of the expulsion plunger, and hence the mixing chamber volume. In this way the optimum conditions can be maintained throughout the mold filling process even when handling plastics components with very diverse properties, for the purpose of producing a great variety of end products.

According to a further embodiment of the invention, the end faces of the nozzle bodies match the shape of the surface of the guide bore. It has proved particularly advantageous if the end faces are plane, as this reduces problems concerning the outlet of the plastics components mixture from the mixing chamber. Moreover, the mixing chamber can then be freed completely from any residues adhering to the wall of the guide bore.

In an embodiment of the invention which is advantageous in respect of the dimensions of the cross-section of the mixing chamber and guide bore, the latter has a polygonal, in particular square or rectangular, cross-section. It will be appreciated that this type of cross-section facilitates manufacture of the apparatus.

The invention is explained in more detail below with reference to an embodiment illustrated in the drawings, wherein:

FIG. 3 is an elevation view of the apparatus of FIG. 1 showing further details thereof; and FIG. 3a is a sectional plan view of the apparatus taken at line A—A in FIG. 3.

Figure 1:
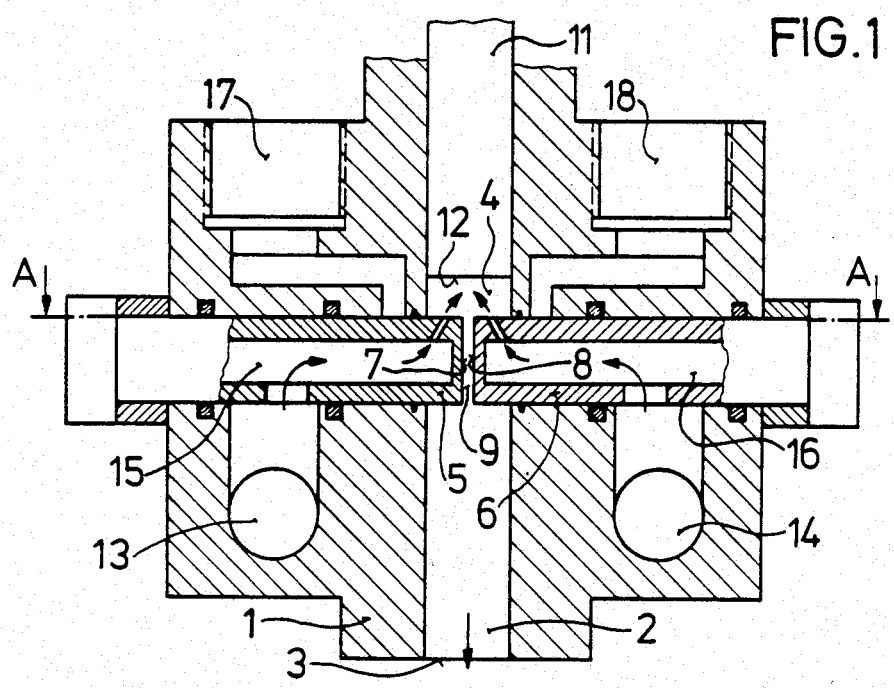
FIG. 1 is a partial elevation view of an embodiment of the invention, taken in section with the nozzle bodies extended into the guide bore and expulsion plunger retracted for mixing.
Figure 1A:
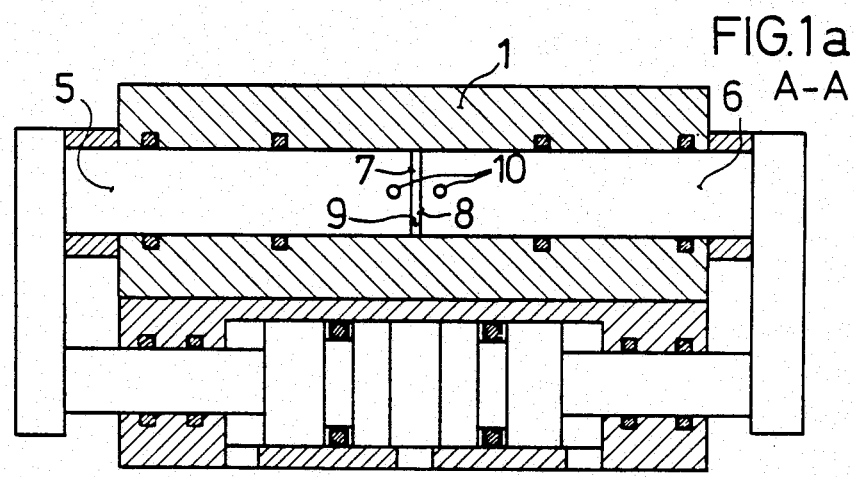
FIG. 1a is a plan view of the apparatus in section taken at line A—A of FIG. 1.

The mixing apparatus illustrated consists essentially of a housing 1 in which is provided a guide bore 2 for an expulsion plunger 11. The outlet orifice of the guide bore is marked 3. A portion of the guide bore is constructed as a mixing chamber 4. This is bounded, when the expulsion plunger is in the position for mixing (FIG. 1), by the bottom face 12 of the plunger and by two diametrically opposite nozzle bodies 5 and 6 which can be slidingly inserted into the guide bore. The end faces 7 and 8 of the nozzle bodies create an adjustable gap 9 serving as the outlet orifice from the mixing chamber. Each nozzle body is provided with one or more inlet orifices 10, these being so located that the plastics components flowing through them impinge on one another at an angle in the mixing chamber. The feed of the plastics components is via inlet channels 13 and 14 in the housing 1 and bores 15 and 16 in the nozzle bodies.

Figure 2:
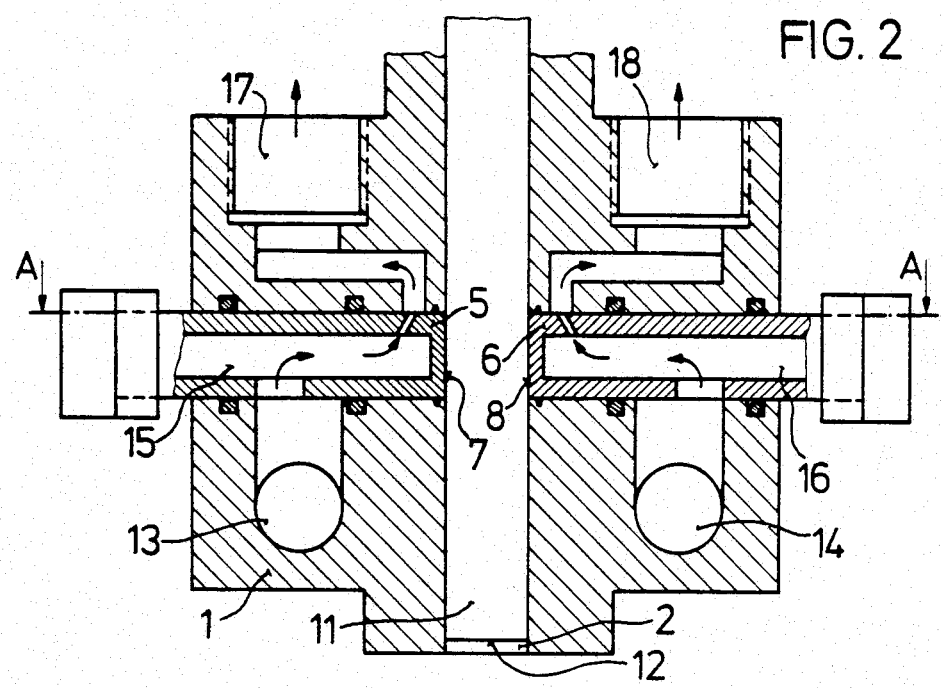
FIG. 2 is a partial elevation view of the apparatus of FIG. 1 taken in section with the nozzle bodies retracted from the guide bore and the expulsion plunger extended.
Figure 2A:
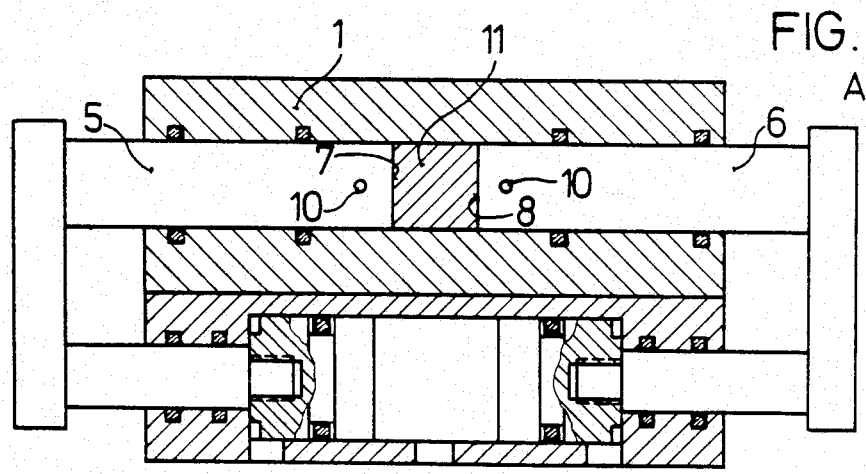
FIG. 2a is a plan view of the apparatus taken at line A—A of FIG. 2.

As soon as an injection cycle has been completed, the nozzle bodies 5 and 6 are moved into their other terminal positions, ie. retracted from the guide bore 2, so that their end faces 7 and 8 are flush with the wall of the guide bore. This closes off the inlet orifices, and at the same time the nozzle bodies are subjected to forced mechanical cleaning, in that any residual mixture is scraped off their surfaces. The expulsion plunger 11, whose cross-section matches that of the guide bore, thereafter provides a final cleaning by moving into the zone of the outlet orifice 3. In this position, depicted in FIG. 2, which is the closed position, the plastics components flow through the inlet channels 13 and 14, nozzle bodies 5 and 6 and return channels 17 and 18 back to reservoirs which are not shown in the drawing.

According to FIG. 3, the movement of the expulsion plunger 11 is effected by means of a hydraulic piston/cylinder unit at the rear end of the plunger. The hydraulic piston 19 can be subjected to pressure from either side and is guided in a cylinder 20 with connecting lines 21 and 22. The stroke of the expulsion plunger and hence the volume of the mixing chamber 4 can be varied by means of the adjustment screw 23. The position of the nozzle bodies 5 and 6 is determined by stops 24 and 25.

I have found that optimum mixing can be achieved in particular at a defined pressure in the mixing chamber 4. To maintain this optimum operating point, the pressure in the mixing chamber is recorded by means of a sensor 26, and the actual values found are compared, in the apparatus 27, with the preset intended values. Deviations between the intended and actual values are employed to actuate a control valve 28, by means of which the positions of the nozzle bodies 5 and 6 and of the expulsion plunger 11 are varied. The nozzle bodies and the expulsion plunger may be moved either simultaneously or independently of one another, and hence a variation of pressure with time can, if desired, be obtained in the mixing chamber (4).

I claim:

1. Apparatus for producing a preferably chemically reactive mixture of two or more plastics components, which apparatus comprises a housing having inlet channels for the individual plastics components and a guide bore for an expulsion plunger which can move to and fro, a portion of this guide bore being constructed as a mixing chamber which, in the retracted position of the expulsion plunger, is bounded by the end face of the plunger, while at the opposite side is provided an outlet orifice for the mixture of plastics components, a restrictor movably located in a bore running transversely to the guide bore of the expulsion plunger, being located immediately downstream of the mixing chamber, the restrictor being formed of two at least approximately coaxially arranged nozzle bodies which can slidingly enter the guide bore, each of said nozzle bodies having inlet orifices for the plastics components, said inlet orifices being so arranged relative to the mixing chamber that the plastics components impinge on one another at an angle in the mixing chamber and whereby movement of said nozzle bodies will define an adjustable gap between them and open and close said inlet orifices.

2. Apparatus as claimed in claim 1, wherein the nozzle bodies are arranged to be slidingly movable at right angles to the lengthwise axis of the guide bore.

3. Apparatus as claimed in claim 1, wherein the position of the nozzle bodies within the guide bore is controllable as a function of the mixing chamber pressure.

4. Apparatus as claimed in claim 1, wherein the nozzle bodies can be adjusted independently of one another as regards their distance from the lengthwise axis of the guide bore.

5. Apparatus as claimed in claim 1, wherein the end faces of the nozzle bodies match the shape of the surface of the guide bore.

6. Apparatus as claimed in claim 1, wherein the guide bore is of polygonal cross-section.

7. Apparatus for producing a mixture of two or more plastic components, said apparatus comprising:
- a housing having inlet channels for the individual plastics components;
- a guide bore within said housing, said guide bore having an outlet at one end thereof;
- an expulsion plunger movable to and fro between said outlet and an opposite end within said guide bore, said expulsion plunger having a bottom face at one end thereof;
- a pair of nozzle bodies each having an end face and each nozzle body being slidingly mounted in said guide bore in opposition to one another and retractable therefrom so as to form an adjustable gap between said end faces of said nozzle bodies, said nozzle bodies and said bottom face of said expulsion plunger defining a mixing chamber within said guide bore when said expulsion plunger is moved toward said opposite end of said guide bore;
- an inlet orifice in each of said nozzle bodies and in communication with one of said inlet channels, each of said orifices being located adjacent an end face and directed at an angle into said mixing cavity of said guide bore when the said nozzle bodies are extended therein, whereby the plastics components will flow through said inlet orifices and impinge on one another within said mixing chamber, and wherein the said inlet orifices are closed by said housing and flow stopped upon retracting the nozzle bodies from said guide bore; and
- means connected to adjust the positions of said nozzle bodies and expulsion plunger within said guide bore.

8. Apparatus as claimed in claim 7, wherein the position of the nozzle bodies within said guide bore is controllable as a function of the mixing chamber pressure.

* * * * *